(12) United States Patent
O'Leary (10) Patent No.: US 8,417,993 B2
(45) Date of Patent: Apr. 9, 2013

(54) FUZZ TESTING AND ATTACK-SURFACE SCOPING FOR URI HANDLERS AND PLUGGABLE PROTOCOLS

(75) Inventor: Arthur James O'Leary, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1211 days.

(21) Appl. No.: 11/766,582

(22) Filed: Jun. 21, 2007

(65) Prior Publication Data

US 2008/0320328 A1 Dec. 25, 2008

(51) Int. Cl.
*G06F 11/00* (2006.01)

(52) U.S. Cl.
USPC ....... 714/25; 714/26; 714/32; 726/6; 713/100

(58) Field of Classification Search ............... 714/24–25
See application file for complete search history.

(56) References Cited

U.S. PATENT DOCUMENTS

| | | | |
|---|---|---|---|
| 5,598,470 A * | 1/1997 | Cooper et al. | 713/165 |
| 6,092,100 A | 7/2000 | Berstis | |
| 6,317,730 B1 * | 11/2001 | Neuneier et al. | 706/2 |
| 6,446,120 B1 * | 9/2002 | Dantressangle | 709/224 |
| 6,970,804 B2 * | 11/2005 | Siegel et al. | 702/182 |
| 7,483,824 B1 * | 1/2009 | Hill | 703/14 |
| 7,594,142 B1 * | 9/2009 | O'Leary et al. | 714/38 |
| 7,680,743 B2 * | 3/2010 | Peinado et al. | 705/59 |
| 2003/0191985 A1 * | 10/2003 | Barrett | 714/32 |
| 2004/0078711 A1 * | 4/2004 | King et al. | 714/43 |
| 2005/0044451 A1 | 2/2005 | Fry | |
| 2006/0155398 A1 * | 7/2006 | Hoffberg et al. | 700/86 |
| 2007/0203973 A1 * | 8/2007 | Landauer et al. | 709/203 |
| 2008/0288822 A1 * | 11/2008 | Wu et al. | 714/32 |
| 2008/0301647 A1 * | 12/2008 | Neystadt et al. | 717/127 |
| 2008/0301813 A1 * | 12/2008 | Neystadt et al. | 726/25 |

FOREIGN PATENT DOCUMENTS

| | | |
|---|---|---|
| WO | 2005026872 | 3/2005 |
| WO | 2005055073 | 6/2005 |

OTHER PUBLICATIONS

Andreas Poller, Oct. 23, 2006, Approaches for Automated Software Security Evaluation, Chemnitz University of Technology, pp. 20-24 and 49-52, pp. 69-72.*
Zhiqiang Lin, Convincing Exploitable Software Vulnerabilities, Jun. 24, 2008, IEEE, vol. 9, pp. 3-6.*
Poller, A. "Approaches for Automated Software Security Evaluations", Diploma Thesis, Chemnitz University of Technology. Oct. 23, 2006. Published online at [http://archiv.tu-chemnitz.de/pub/2006/0187/data/AutoSecEval.pdf], retrieved on Feb. 4, 2009.

(Continued)

*Primary Examiner* — Nathan Flynn
*Assistant Examiner* — Viral Lakhia (57) ABSTRACT

Systems and methods for testing uniform resource identifier protocols, comprising a fuzzer that can accept an input, and produce a fuzzed uniform resource identifier (URI), and a debugger that monitors effects of invoking the fuzzed uniform resource identifier. The input can comprise a directory containing a plurality of valid uniform resource identifier bodies, which can be fuzzed and invoked. The debugger can monitor a target application as well as other applications and/or processes affected by the uniform resource identifier as invoked.

20 Claims, 10 Drawing Sheets

OTHER PUBLICATIONS

Singhal, A., et al. "Guide to Secure Web Services", Recommendations of the National Institute of Standards and Technology, Special Publication 800-95(Draft). Sep. 2006. pp. 87-93. Published online at [http://csrc.nist.gov/publications/nistpubs/800-95/SP800-95.pdf], retrieved on Feb. 4, 2009.

Miller, B.P., et al. "An Empirical Study of the Robustness of MacOS Applications Using Random Testing", First International Workshop on Random Testing, Portland, Maine, Jul. 20, 2006. Published online at [ftp://ftp.cs.wisc.edu/paradyn/technical_papers/Fuzz-MacOS.pdf], retrieved on Feb. 4, 2009.

Forrester, J.E., et al. "An Empirical Study of the Robustness of Windows NT Applications Using Random Testing", 4th USENIX Windows Systems Symposium, Seattle, Aug. 2000. Published online at [http://pages.cs.wisc.edu/~bart/fuzz/fuzz-nt.html], retrieved on Feb. 4, 2009.

International Search Report dated Feb. 10, 2009, mailed Feb. 5, 2009, for PCT Application Serial No. PCT/US2008/066153, 9 pages.

Laurie Auronen. Tool-Based Approach to Assessing Web Application Security. Nov. 4, 2002. http://users.tkk.fi/~lauronen/works/Lauri_Auronen_netsec_2002.pdf. Last accessed Apr. 11, 2007.

Jedidah R. Crandall, et al. On Deriving Unknown Vulnerabilities from Zero-Day Polymorphic and Metamorphic Worm Exploits. CCS'05, Nov. 7-11, 2005. http://delivery.acm.org/10.1145/1110000/1102152/p235-crandall.pdf? key1=1102152&key2=1607916711&coll=GUIDE&dl=GUIDE&CFID=16115537&CFTOKEN=96722738. Last accessed Apr. 11, 2007.

C. C. Michael, et al. Black Box Security Testing Tools. Dec. 28, 2005. https://www.buildsecurityin.uscert.gov/daisy/bsi/articles/tools/black-box/261.pdf. Last accessed Apr. 11, 2007.

Sacha Faust. Web Application Testing with SPI Fuzzer. SPI Dynamics, 2005. http://www.spidynamics.com/assets/documents/SPIFuzzer.pdf. Last accessed Apr. 11, 2007.

Jin-Cherng Lin, et al. An Automatic Revised Tool for Anti-Malicious Injection. Computer and Information Technology, 2006. CIT apos;06. The Sixth IEEE International Conference on Volume, Issue, Sep. 2006 pp. 164-164. http://ieeexplore.ieee.org/iel5/4019822/4019823/04019951.pdf?tp=&isnumber=&arnumber=4019951. Last accessed Apr. 11, 2007.

* cited by examiner

FUZZ TESTING AND ATTACK-SURFACE SCOPING FOR URI HANDLERS AND PLUGGABLE PROTOCOLS

BACKGROUND

In today's computing world, security has come to the forefront of technological concerns due to the proliferation of viruses, Trojan horses, worms, and other malicious software designed to harass and annoy. Security vulnerabilities, such as buffer overruns, heap overflows, parsing issues and race conditions, are often the cause of a number of these software issues. Virtually all businesses, banks, universities, hospitals and other organizations rely entirely upon computing systems to store, access, and distribute sensitive information. Networks such as the Internet and smaller local networks are prevalent and provide a greater degree of flexibility and capabilities than ever before attained. However, networking presents attackers with a unique opportunity to intercept communications, or otherwise compromise security systems without alerting the computing system operator of the breach. A serious security breach could easily cause damage measured in the billions of dollars. Given the high stakes involved, and the persistence of attackers, there is a need to strengthen computing security measures.

Those interested in disrupting computers from their normal working order are ever seeking new attack vectors. The complexity of software and hardware in today's networked computing environment has enabled unprecedented levels of communication and productivity; but due to the complexity, it is increasingly difficult for software producers and testers to identify and thwart all possible security threats. A race between security experts on the inside, and hackers or other malicious groups on the outside is constantly being run to identify possible security flaws in a product. Automation has played a large role in this process, enabling far more testing than would be possible otherwise. Fuzzing, a process by which good data is altered into a corrupted form, is one way in which the testing process has moved forward. Despite the use of fuzzers and other forms of automated testing, there still exists a need for a more secure computing environment.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure concerns systems and methods for fuzz testing URI handlers and/or pluggable protocols. A traditional file fuzzer can be directed at a file or series of files, and a "glue" application (e.g., a process developed and run as an intermediary between two or more external processes) can be implemented to format the files in preparation for launching an application or applications through the Operating System's handling of a URI. Alternatively, a URI fuzzer can be implemented to fuzz valid URI bodies, and append a plurality of valid URI headers to the fuzzed URI bodies, and invoke the fuzzed URIs. A debugger can be employed in order to monitor and record abnormal behavior of a computing system in response to the fuzzed URIs. Since the fuzzed URIs can have unexpected results, the debugger can have a broad scope under its care to ensure that no unexpected effect is missed. If and when an abnormality is detected, the debugger can record the fuzzed file or fuzzed URI that caused the abnormality, and in addition can record other information relating to the circumstances surrounding the abnormality in order to assist with diagnosis and resolution of the abnormality. Alternatively, the debugger can monitor for abnormalities, and report issues back to the fuzzer. The fuzzer can record the input and details of the abnormality for additional testing. A user can direct a series of input template files to the system, or a directory containing several template files to be tested by the fuzzer. The template files can contain contents used to generate valid URI strings. Alternatively, the user can input an empty directory and in response the system can request a list of supported URIs from a registry or other central service, and create a template file or directory of template files based on the supported URI protocols on a given system.

The results can be recorded in a format that eases reproducibility of the abnormalities, by creating a file, such as an HTML file, including the fuzzed input and surrounding circumstances. An artificial intelligence component can observe the results and suggest fuzzing techniques back to the fuzzer in order to aid diagnosis and location of the abnormality. In addition, the artificial intelligence component can identify bugs according to a set threat level, as defined by user preferences or default settings. Many URI protocols have certain constraints upon the input that the URI handler can accept that will likely be violated by random fuzzed inputs, which can contain any number and type of character. This will typically lead to a number of apparent functional issues in the target applications, which are not necessarily interesting from the security point of view. To address this situation, the subject disclosure enables these type of semantic errors to be withheld from reporting, while still allowing serious issues to be presented to a tester. In this way, unwanted noise is kept from the tester in order to facilitate testing of the URI handler and protocol.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods for testing for security exploits in a computing environment are provided. Data fuzzing is one way in which software can be tested for possible security exploits. A fuzzer begins with a normal piece of data, and corrupts the data in a random or pseudo-random way. The fuzzed data can then be passed to the software being tested as an input of any kind, and the software is monitored for any abnormal behavior. In this way, software can be tested for its handling of certain types of data, and vulnerabilities can be detected and dealt with before a product is shipped. The subject disclosure relates to fuzzing applications launched through Uniform Resource Identifier (URI) handlers. URI handlers can also be referred to as pluggable protocols. When an application is installed, a given set of handlers for that application can be registered. The URI handlers can be written to perform virtually any task; one example is a URI handler related to a web browser. When a user visits a web page, there are handlers in place to hand off control to a sub-component such as an email program. If the web page contains a link containing the "mailto:" URI handler, clicking on the link can launch the application registered as the user's default email application, and compose an email to the address shown in the link. Sample URIs can include the email address of the recipient of the email message, a subject for the email, and some initial body text. These values can be passed to the URI handler to launch the external application (in this case, the email application) and perform some task. There are myriad URI handlers, each with its own set of protocols, and while for purposes of illustration and brevity only a few examples will be given herein, the principles of the subject disclosure can apply in any relevant context.

As related to URI handlers, fuzzing can be a valuable method to find and resolve possible security issues in a program. A tester can direct a fuzzer toward a URI handler, and monitor the operation of the target application, and any other application that may launch during the process. If and when a bug is detected, the fuzzed input file, along with other relevant information about the environment and result of the detected issue, can be identified for follow up. For example, the "mailto:" protocol is described. There are standards that outline the format for building "mailto:" links, and an application developer will likely try to implement all of the functionality that the standard outlines. Developers and testers will likely pay a good deal of attention to the most-commonly used features of the protocol-handling code, but could miss out on a security bug in some less-frequently used features or in some rare combination of inputs. Fuzzing the "mailto:" protocol can provide the test coverage necessary to discover this style of vulnerability, simply because the number and variations of test cases can be far greater than what a human tester can achieve in a reasonable time. Using fuzzing infrastructure, simply targeting the "mailto:" protocol with the fuzzer can lead to these types of issues being discovered and reported to the developers before they materialize into a serious security threat built into a final version of a product.

A pluggable protocol can consist of the head of the URI (mailto:), and a set of valid bodies to the URI, such as the sender's email address, the recipient's email address, etc. In one embodiment, a traditional file fuzzer can be re-purposed to do the URI fuzzing. A template file may contain the body of the URI which can be any set of files that are to be fuzzed and passed to the URI handler. The template file does not need any type of naming convention. The file fuzzer can take the template file and create a new fuzzed file. Next, the file fuzzer can hand-off the fuzzed file as a command line parameter to any executable. In one aspect, the file fuzzer calls an application, handing off the fuzz file location as the parameter. The glue application can take two arguments—the protocol being tested, and a path to a file that contains the body of the URI to launch. There is a debugger that monitors an application launched by the fuzzed file for violations, corruption, and other types of exploitable security bugs. The file fuzzer launches the glue application with the debugger monitoring the process. The glue application can receive a body of a URI and apply the appropriate URI protocols to the body before passing the contents of the fuzzed file to the URI handler. The glue application can take the head of the URI as the first argument and the name of the file containing the body of the URI is the second argument. The glue application can then open the file, and read out the contents (in this case, the fuzzed body), and combine this into one URI string that can be invoked through the Operating System.

In another embodiment, a URI fuzzer can be implemented. An input directory can be specified to the URI fuzzer, containing a sub-directory for each URI head. The sub-directory for each URI head can contain several files, each containing a valid URI body. The URI fuzzer can apply fuzzing techniques to a URI body and/or head, and invoke the URI. A debugger can be used to monitor the results for any abnormality and record and report the results for follow up. According to this embodiment, the fuzzed URI string can be used as the URI would be used under normal circumstances, creating a more authentic test situation than previous methods.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component," "model," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
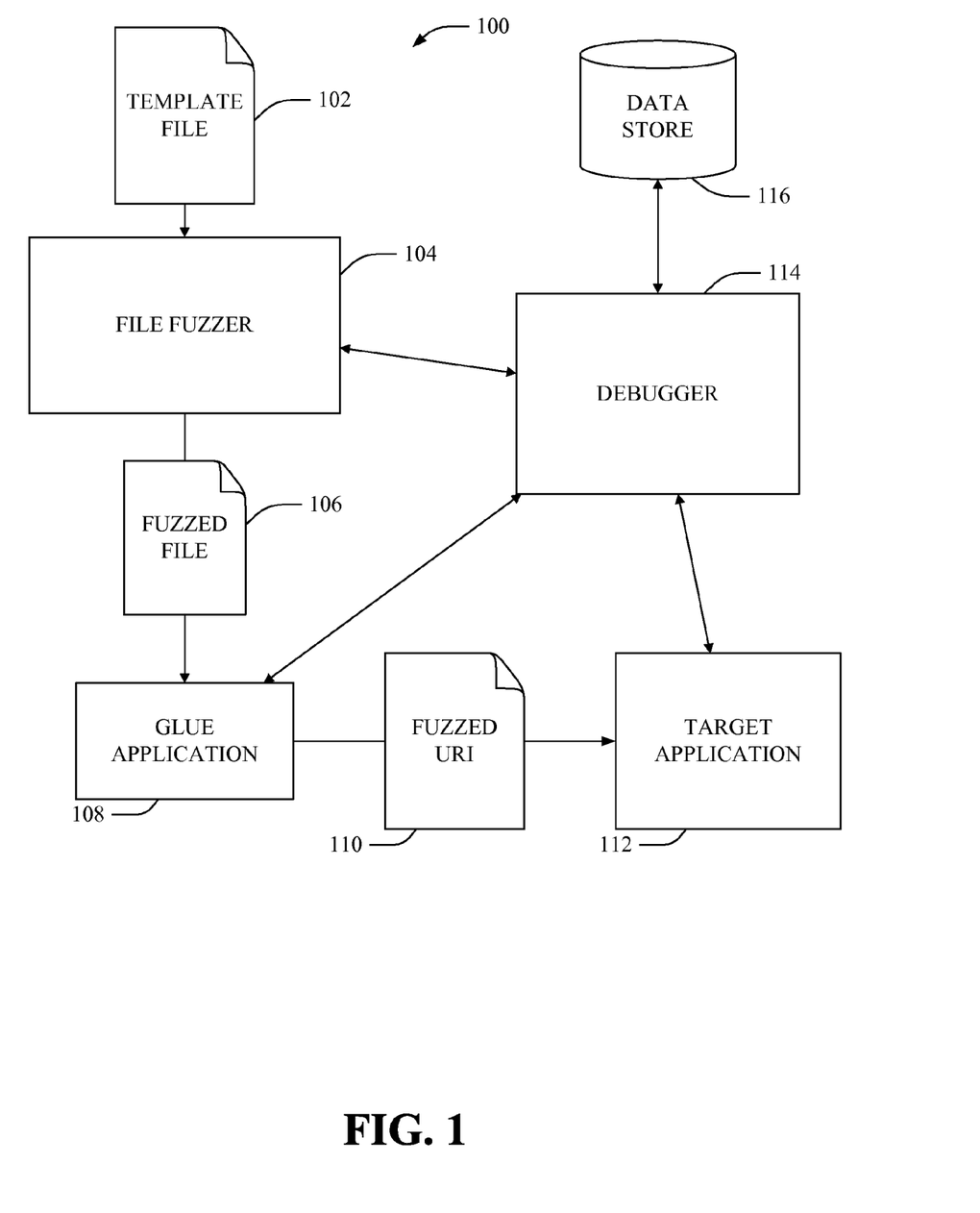
FIG. 1 is a block diagram of a system for fuzz testing a URI handler, including a file fuzzer, a glue application, a target application, a debugger and a data store.

Referring now to the figures, FIG. 1 illustrates a system 100 for testing URI handlers. A template file 102 can include the body of a valid URI, which could be appended to a URI header in order to launch a target application under normal conditions. There are many valid URI types, each with its own set of protocols and parameters. For purposes of illustration and not limitation, the "mailto:" protocol is described. The template file 102 can contain values such as a recipient's address and an email subject. A file fuzzer 104 can read the contents of the template file 102 and "fuzz" the data. File fuzzing is generally any method of altering data in such a way to explore possible security flaws in a program. An example of a clean, or unfuzzed, URI body is "JohnDoe@emailaddress.com?subject=Party this Thursday." whereas after the fuzzer 104 fuzzes the body it appears as, "JohnDoe@emailaddress.AAAAAAAAAAAAAAAA AAAAAA?subject=Party this Thursday". The random (or pseudo-random) tail can be added in order to explore what happens when passed to another application. In this embodiment, once the file fuzzer 104 fuzzes the template file 102, the fuzzed file 106 is then passed to a glue application 108.

According to an aspect, the glue application 108 can append the URI head to the beginning of the contents of the fuzzed file 106. In the example of the "mailto:" protocol, the glue application 108 will append "mailto:" to the beginning of "JohnDoe@emailaddress.AAAAAAAAAAAAAAAAAAAA AAA?subject=Party this Thursday" and send the fuzzed URI 110, "mailto :JohnDoe@emailaddress.AAAAAAAAA AAAAAAAAAAAAA?subject=Party this Thursday" to the Operating System which then launches a target application 112. Meanwhile, a debugger 114 can be launched to oversee the operation of the target application 112, the glue application 108, and the file fuzzer 104, and record any abnormalities. The debugger 114 can monitor any other applications that may launch in response to the fuzzed URI 110. The debugger 114 can also communicate with a data store 116 in order to record fuzzed inputs that raise issues. The data store 116 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store of the present systems and methods is intended to comprise, without being limited to, these and any other suitable types of memory.

Several fuzzed URIs 110 can be fed into the target application 112 until the test bed has been performed a predetermined number of times or until a security issue is identified. Fuzzed URIs 110 that cause issues can be flagged and removed from future testing until the problems can be addressed. Moreover, the same issue in code can be brought to light by several different fuzzed inputs, and the debugger 114 can compartmentalize the results in order to limit the output to the tester. The debugger 114 can also record information relating to the circumstances of the issue such as what happened, where the problem occurred, etc. This information can be used by a tester to reproduce the bug, and ultimately for a developer to eliminate the problem.

Figure 2:
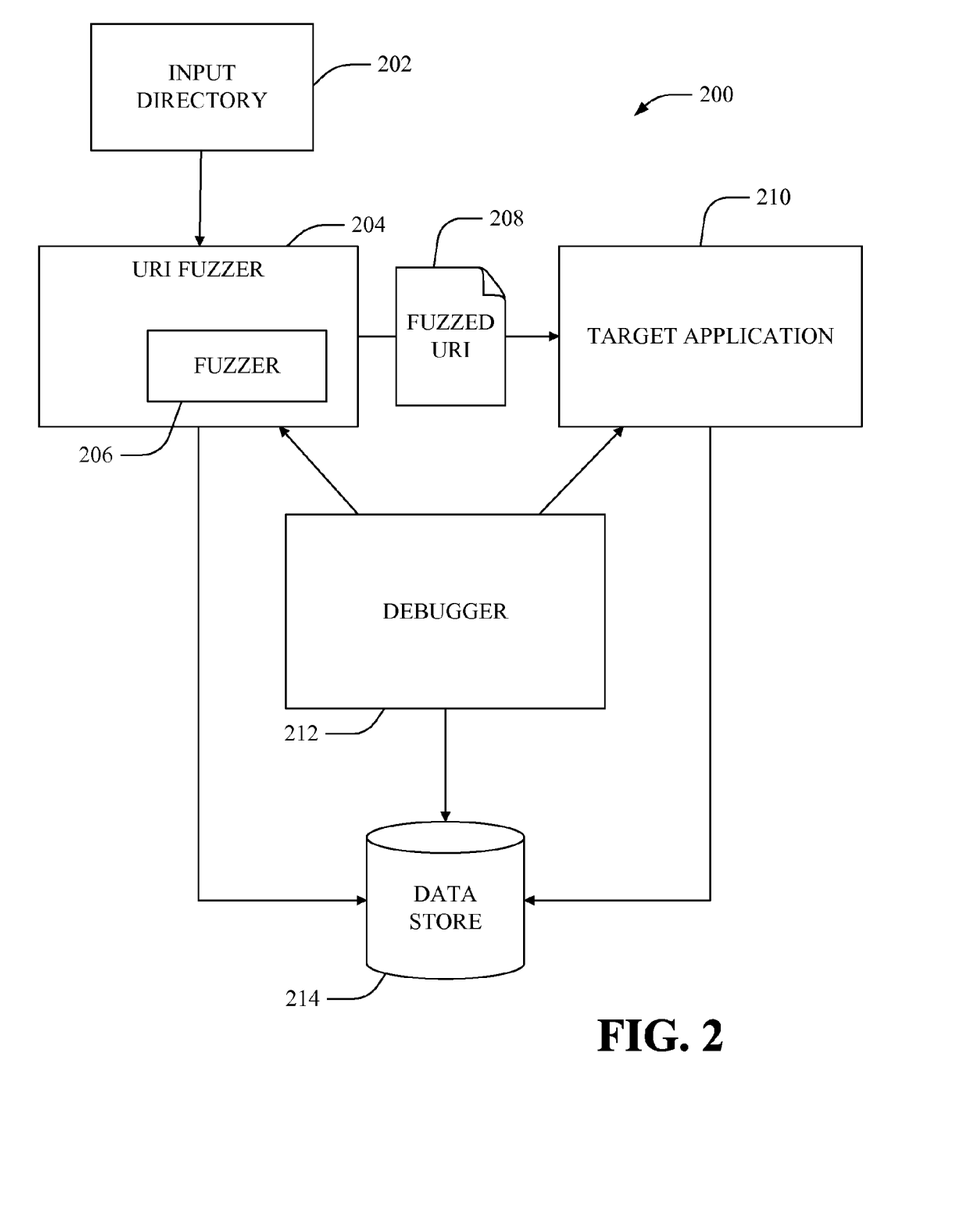
FIG. 2 is a block diagram of an illustrative system for fuzz testing a URI handler, including a URI fuzzer, a debugger, a target application, and a data store.

Turning to FIG. 2, an alternative embodiment 200 for fuzz testing a URI handler is shown. According to an aspect, an input directory 202 can contain several valid URI bodies. A URI fuzzer 204 can read the URI bodies, and apply fuzzing techniques to them. In one embodiment, the URI fuzzer 204 comprises a traditional fuzzer 206, as described above with respect to FIG. 1. The URI fuzzer 204 can create a fuzzed URI 208, which can comprise a header and a body, combined into one functioning URI command. The URI fuzzer 204 can fuzz any portion of the URI to fully explore possible exploits and vulnerabilities. In the example of the "mailto:" protocol, the target application 210 can be the user's default email application. Depending on the fuzzed URI, the target application 210 can be any application or group of applications that launch in response to invocation of the fuzzed URI 208. For example, the URI fuzzer 204 can create a fuzzed link on a web page, such as "JohnDoe@emailaddress.AAAAAAAAAAAAA," and invoke the URI as though a user had clicked on the link. One of the benefits of fuzz testing is that it can be randomized, and makes no assumptions as to system behavior. It can simply feed malformed data to the application. The subject disclosure is also free from assumptions as to behavior, even regarding which application will launch when the URI is invoked. It is possible for subsequent applications to launch, and perform an unexpected operation in response to a certain fuzzed URI. This can enable an attacker to invoke and control applications from a URI, without authorization. This is one of the many possible security issues the subject disclosure can address.

Similar to the embodiment described with respect to FIG. 1, a debugger 212 can monitor a target application 210, as well as any other application that may initiate in response to invocation of the fuzzed URI 208. The debugger 212 can store diagnosis information in a data store 214. The URI fuzzer 204, and the target application 210 can also interact with the data store 214 to log information relating to a crash, or other security issue that may arise. A tester can then analyzed the data, diagnose the problem, reproduce the bug if necessary, and resolve the security issue. Additionally, the URI fuzzer 204 can be set to automatically generate files (e.g., HTML) that can host an exploit for each discovered vulnerability. This allows for one-click reproducibility of security bugs discovered during the URI fuzzing process.

Figure 3:
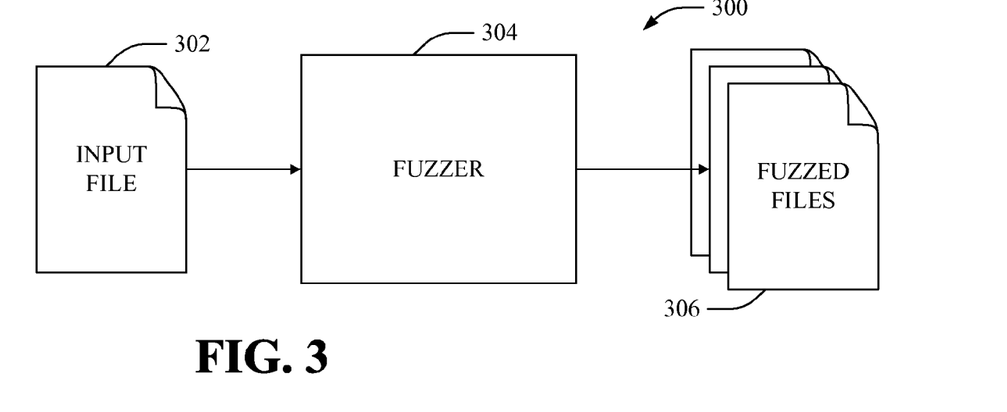
FIG. 3 is a block diagram of a descriptive system for fuzzing files, including input files, a file fuzzer, and several output fuzzed files.

Moving on to FIG. 3, further operation 300 of a fuzzer is shown. In general, an input file 302 can comprise any file that can be used in fuzz testing. According to an embodiment of the subject disclosure, the input file can be a URI body, or a URI header, or both. This input file 302 can be passed to a fuzzer 304, which takes the clean (unfuzzed) data from the input file 302, and corrupts the data. The fuzzer 304 can add, remove, or alter any portion of the data with randomly generated (or pseudo-randomly generated) information. The fuzzed data can result in data that resembles the clean data in some respects, but not in others. For example, a piece of clean data can include an alpha-numeric string of some length, while once the fuzzer 304 corrupts the string, it can be a string of any length, including random characters. Alternatively the fuzzer 304 can modify an integer value in the URI body to a value greater than a maximum allowable number (MAX_INT) in hopes of detecting an overflow scenario. The corrupted string can include all or part of the clean data. The fuzzer 304 can produce any number of fuzzed files 306 from any given input file 302. In this way, when combined with an application launcher, testing can be automated and performed at a much more rapid rate than manual testing.

Figure 4:
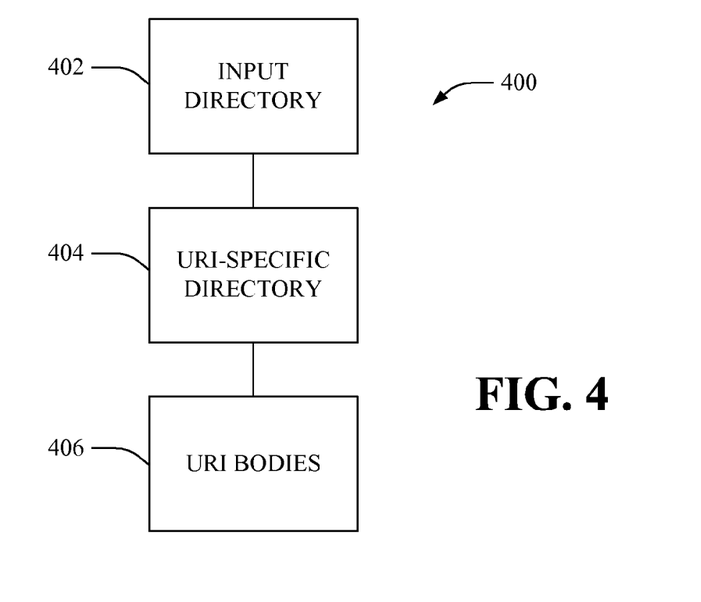
FIG. 4 is a block diagram of an exemplary input system for URI fuzz testing.

Proceeding to FIG. 4, an illustrative embodiment 400 showing operation of an input directory 402 is shown. As described with respect to FIG. 2, in an embodiment of the present disclosure, a fuzzer can read in from an input directory 402 (e.g., element 202 in FIG. 2). The input directory 402 need not follow a naming convention, and can be kept in any location as needed. The input directory 402 can contain several URI-specific subdirectories 404. Each sub-directory 404 can pertain to a URI header, such as "mailto:" or "http:" and so forth. Each sub-directory 404 can contain any number of valid URI bodies 406, which can be fuzzed and invoked as described above. By following this format, multiple URI bodies 406 can easily be tested with each URI header. Many previous URI testing methods do not allow for addressing more than one URI at a time. However, different applications support multiple pluggable protocols and URIs simultaneously, and the subject disclosure enables exploration of the interaction between multiple pluggable protocols.

Figure 5:
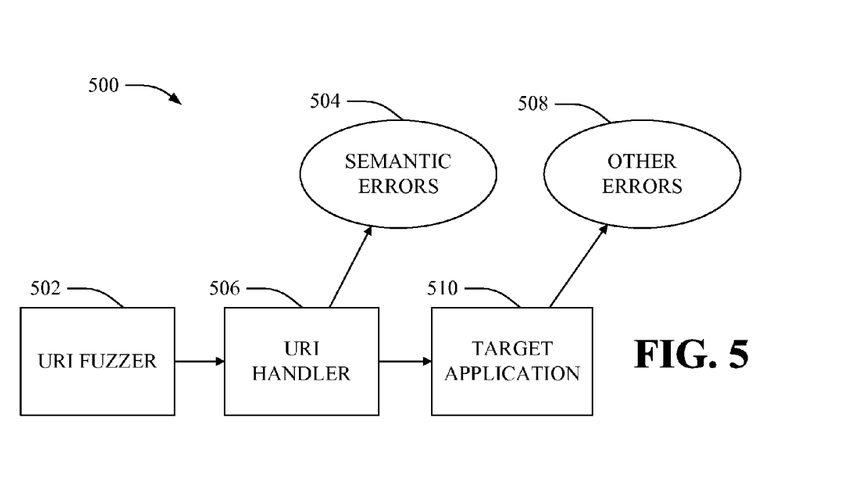
FIG. 5 is a block diagram of a particular system for fuzz testing URIs and pluggable protocols, showing semantic errors produced in the URI handler, and other errors produced by a target application.

Next, FIG. 5 shows an operation 500 of the debugging process according to the subject disclosure. According to one embodiment, a URI fuzzer 502 can invoke a URI. The fuzzing process can create a large number of fuzzed URIs that do not provide insight into the operation of the target application, nor do they add value to a test. It is possible for the fuzzed URI to cause semantic errors 504, that are located by a URI handler 506. While a debugger may recognize these errors and flag them for follow-up, they may not provide value to the testing process, and can therefore be suppressed from the results reported. For example, some Operating Systems can only accept URIs of some maximum length—URIs exceeding this length cannot be properly executed, but this error is not particularly meaningful to testers and security professionals. According to an embodiment, other errors 508 reported by a target application 510 can be recorded and analyzed. Testing requires time and resources, and it can be beneficial to reduce errors that are known to be simply noise, and focus on the errors that can pose legitimate threats to the target application. The subject disclosure can discriminate between trivial errors and potentially threatening errors, and it is to be appreciated that the subject disclosure is not limited to the examples listed above.

Figure 6:
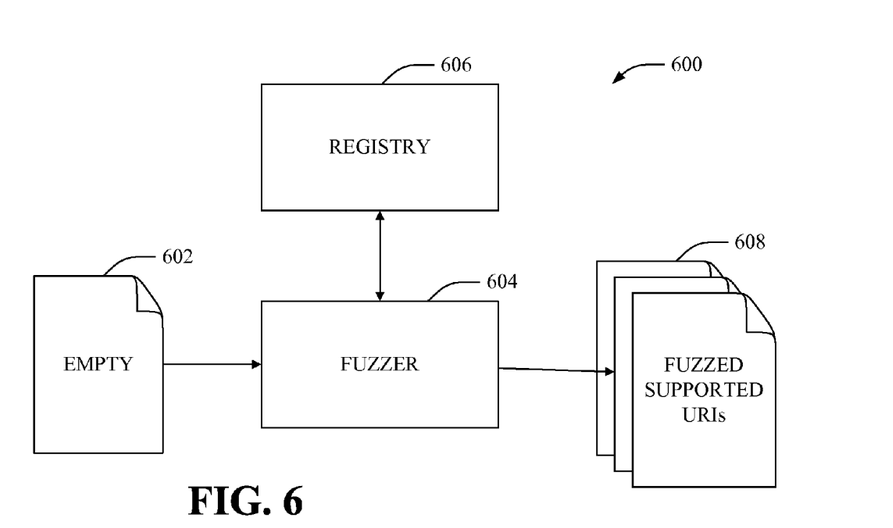
FIG. 6 is a block diagram of a exemplary system for scoping a URI fuzz testing routine.

Moving on to FIG. 6, an illustrative system 600 is shown, according to one embodiment. Frequently, a tester will know in advance which pluggable protocols are to be tested, and can focus a URI fuzzer on that protocol. In another situation, the tester may not know which pluggable protocols are supported on a system, or the tester can be concerned with testing all supported pluggable protocols. According to an aspect, a tester can pass an empty directory 602 to the fuzzer 604. In response the fuzzer 604 can communicate with a registry 606, or other system service, to identify a list of supported pluggable protocols. The fuzzer 604 can then create a plurality of fuzzed files 608, according to the supported list reported by the registry, and test all or part of the protocols in the list. This can eliminate wasteful and unnecessary testing of a protocol that is not supported on a system, while testing all supported protocols, not just those known to the tester. To ensure that no protocol is omitted, the tester can start with protocols desired to be explored, and supplement the test by inputting an empty directory 602.

Figure 7:
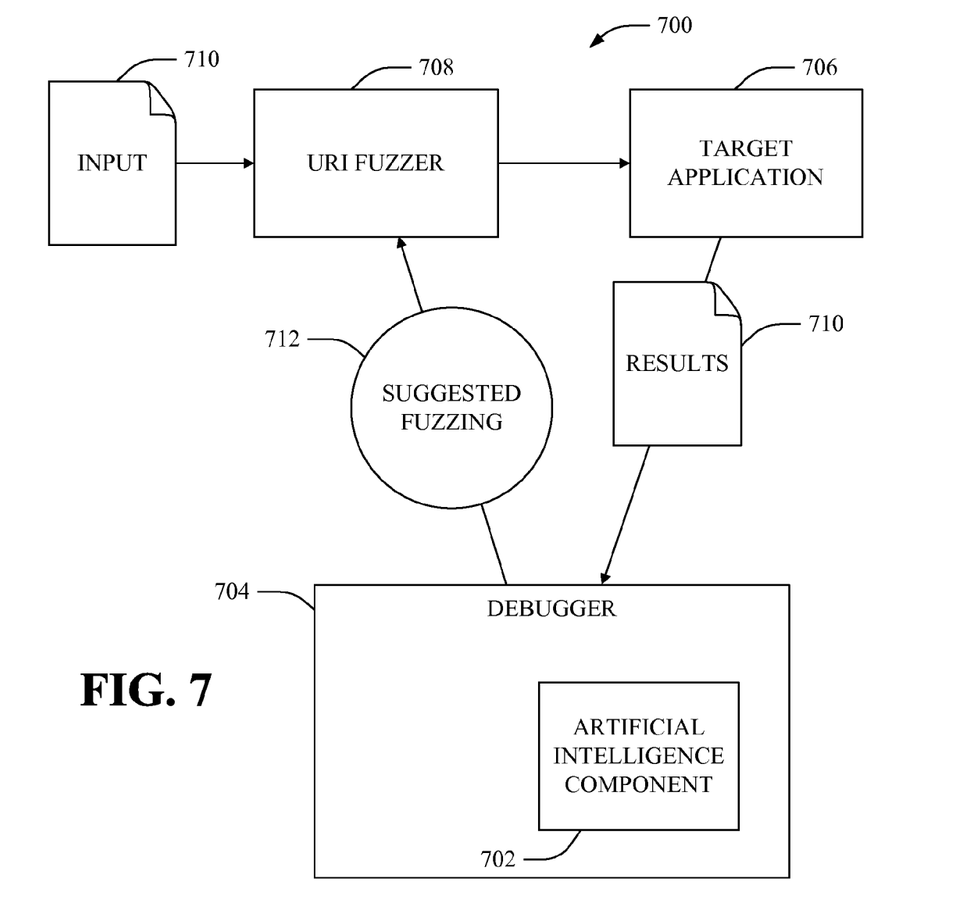
FIG. 7 is a block diagram of a particular system for URI fuzz testing, including a URI fuzzer, a target application, and an artificial intelligence component.

Turning now to FIG. 7, a system 700 for diagnosing potential security issues is shown. An artificial intelligence component 702 can be employed to facilitate testing of URIs with fuzzing methods. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As described above, a debugger 704 can be used to monitor the operation of a target application 706, the URI fuzzer 708, (which can alternatively be a simple file fuzzer combined with another application) and any other application or process caused by invoking a URI. The URI fuzzer 708 can receive an input 710, which can be a template file or directory, as described above with respect to FIGS. 1 and 2. The URI fuzzer 708 is capable of producing a virtually infinite number of variations of the input 710, which can each be tested by invoking the produced fuzzed URI. The target application 706 can report to the debugger 704 by sending results 710 which can include information relating to circumstances surrounding an abnormal situation. The results 710 can also relate to the fuzzed data included in the fuzzed URI in that case. The results 710 can include any information relevant to diagnosis and resolution of a problem caused by the fuzzed URI.

The artificial intelligence component 702 can reside in the debugger 704, or can be an external component in communication with the debugger 704. The artificial intelligence component 702 can assist the diagnosis process by observing operation of the target application 706. The artificial intelligence component 702 can observe which target applications are launching other applications, and specifically which applications are being launched, and what relation there is between the applications. Additionally, the artificial intelligence component 702 can monitor other abnormalities caused by the fuzzed URI and detect/report patterns to the tester.

Furthermore, the artificial intelligence component 702 can analyze portions of the fuzzed data that the fuzzer 708 combines with the clean data for patterns. For example, if adding a given random string to the end of a valid URI body causes an application or a system crash, the artificial intelligence component 702 can send suggested fuzzing 712 to the URI fuzzer 708, including a portion of the suspect string for further testing. In this manner, the culprit set of characters can be isolated in rapid, automated fashion. For example, if appending the string "AAAABBBBCCCC" to a valid URI body causes an error or opens a potential exploit, the artificial intelligence component 702 can instruct the URI fuzzer to append the string "AAAABBBB" to subsequent URI bodies. If the error repeats, it can be assumed that the culprit is likely located in the string "AAAABBBB" and not "CCCC." It is to be appreciated that the above example is for illustrative purposes, and is not meant to limit the scope of the subject disclosure in any way. The artificial intelligence component 702 can observe any characteristic of a fuzzed URI, and send suggesting fuzzing 712 to a URI fuzzer 708 in order to diagnose the potential security threat.

Furthermore, the artificial intelligence component 702 can observe further treatment and resolution of potential security issues caused by a fuzzed URI. If, for example, a certain fuzzing causes the tester to take several steps to address the problem, if and when a similar error occurs in another circumstance, the artificial intelligence component 702 can recall the previous handling of the error, and inform the tester of previous actions taken to address the problem. Whether successful or not, the past approaches to a problem can be helpful in addressing new situations. In the case of a failed action, the artificial intelligence component 702 can inform the tester that in a previous but similar circumstance, an action was taken but was unsuccessful. This information can be helpful to prevent the tester from wasting time addressing a problem from a perspective that has been explored and found less effective. This capability can provide a powerful tool given the nature of testing in today's economy, where it is not necessarily an individual tester working on a problem; rather, it is a team of testers who may not have the opportunity to share notes and experiences with one another. The artificial intelligence component 702 thus can act as a team coordinator, sharing knowledge among several different testers seamlessly.

Fuzzing can produce many responses in a URI handler, some may be of interest to a tester, and some may not. Even some fuzzed inputs that cause a crash may not warrant a detailed inspection by a tester. In some cases, the test may produce a multitude of bugs, and the tester may have time or resources only to address the most pressing bugs. In accordance with an aspect of the subject disclosure, the artificial intelligence component 702 can ensure that a tester is presented with serious bugs, but is not overwhelmed by reporting all possible bugs. The artificial intelligence component can be instructed explicitly what constitutes a serious bug. For example, a tester can indicate that he is looking specifically for a bug or bugs that cause an access violation, and is not particularly concerned with detecting or addressing other concerns. The artificial intelligence component 702 can monitor the results, and present the tester with the fuzzed input that caused an access violation, along with a description of how the event took place, where the problem initiated, and so forth. If the artificial intelligence component 702 detects a more serious bug, it may or may not report it to the tester. The tester can indicate a seriousness scale, where bugs are ranked in order according of the threat they pose. The artificial intelligence component 702 can alert the tester to bugs ranked higher on the scale, and file bugs separately (at least temporarily) that are of lesser concern according to the scale. A tester can rank bugs according to personal preference, or according to a specific task at hand. Alternatively, the scale can be gathered explicitly by observing the tester's treatment of certain bugs, or by observing the bugs' effect or potential effect on the system. Factors that can be taken into consideration to determine the seriousness of a given bug include but are not limited to ease of reproduction, characteristics of the system, potential for damage in the event of a successful attack, etc. In addition, the artificial intelligence component 702 can maintain a default ranking of bugs, to be applied in the absence of, or in addition to, other ranking information. This default ranking can be dynamically updated by communicating with a security database that maintains definitions and other security related issues.

The debugger 704 can observe a plurality of fuzzed URIs and their results 710 from the target application 706. To avoid duplicative efforts, the debugger 704 can, by way of suggested fuzzing 712, include an instruction to the URI fuzzer 708 to temporarily or permanently suspend similar fuzzed URIs from future testing. This allows further testing of the target application under the given fuzzed URI before issuing more problem URIs without knowledge or testing relating to the problems caused by the problem fuzzed URI.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 8:
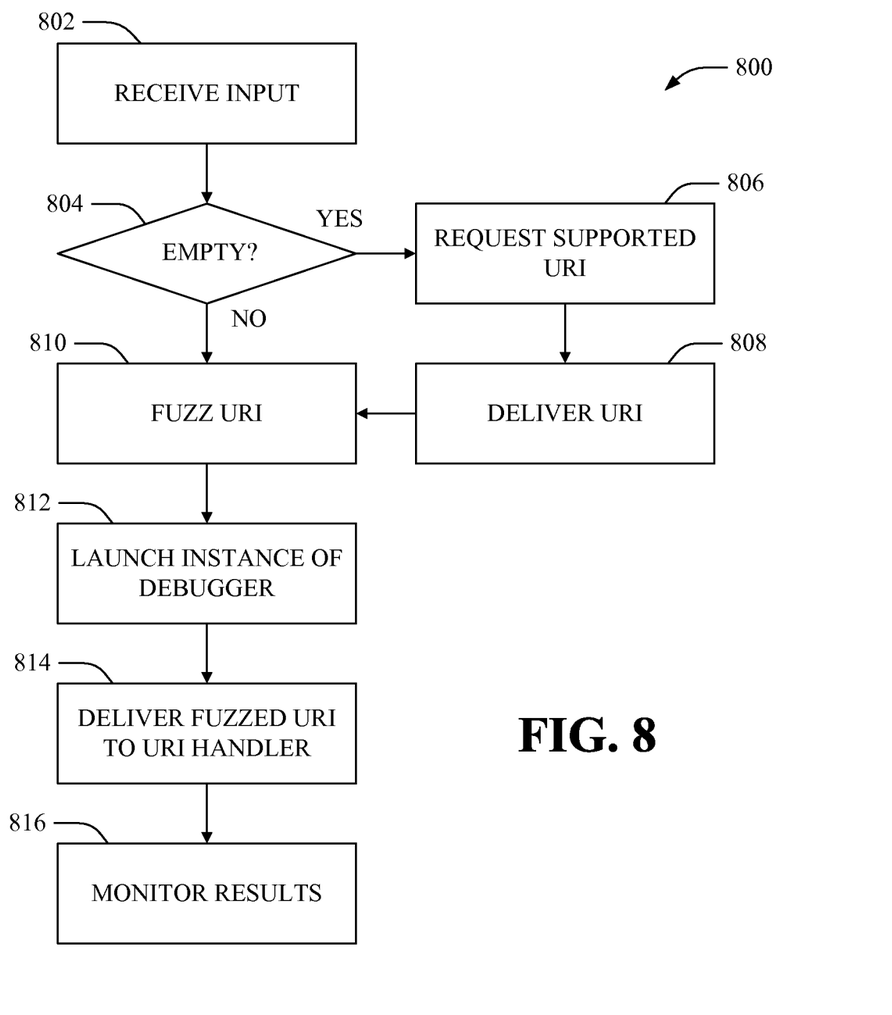
FIG. 8 is a flow chart diagram of an illustrative methodology for fuzz testing a URI.
Figure 9:
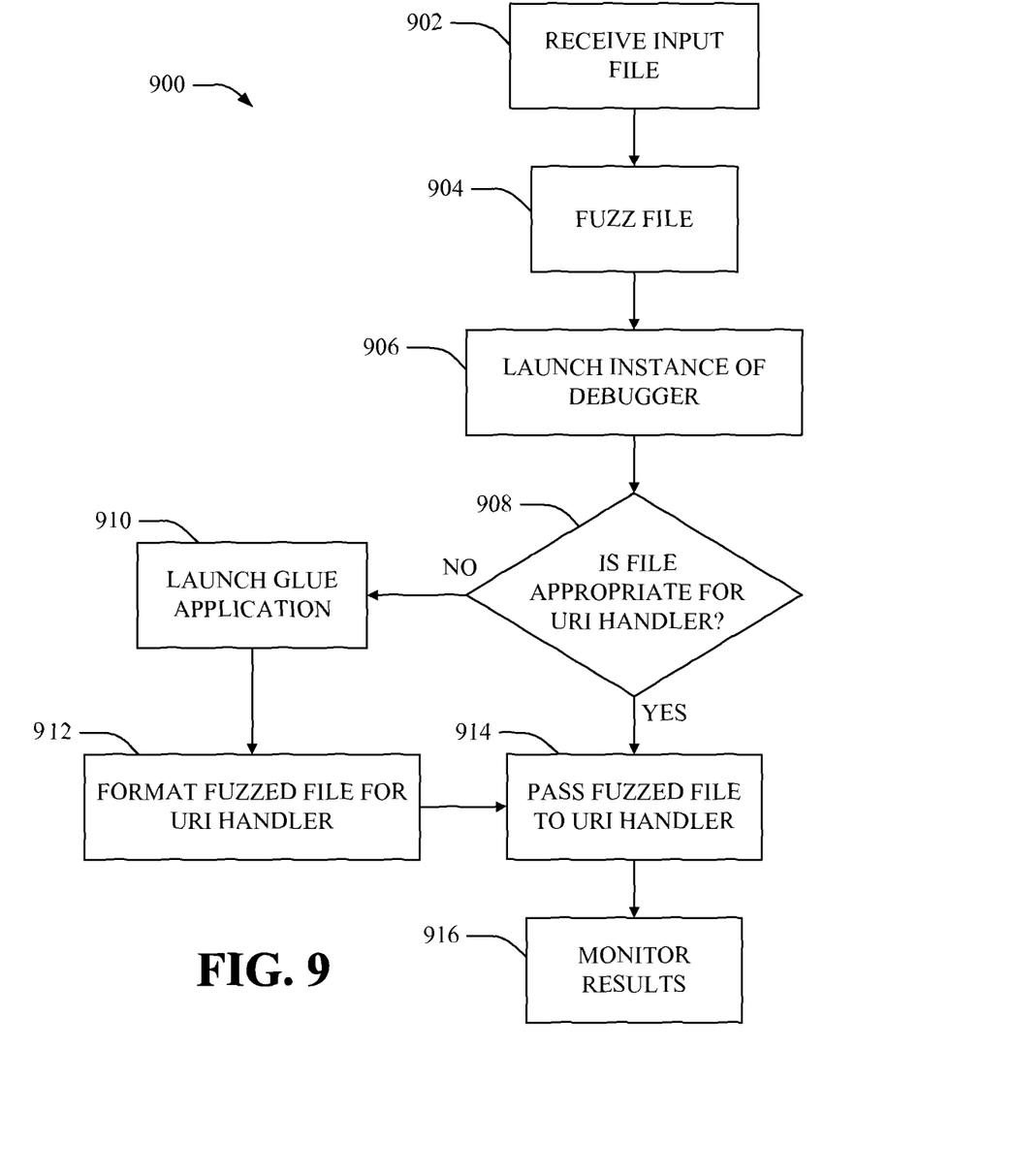
FIG. 9 is a flow chart diagram of an illustrative methodology for fuzz testing a URI, including launching a glue application to format a fuzzed file for a URI as needed.
Figure 10:
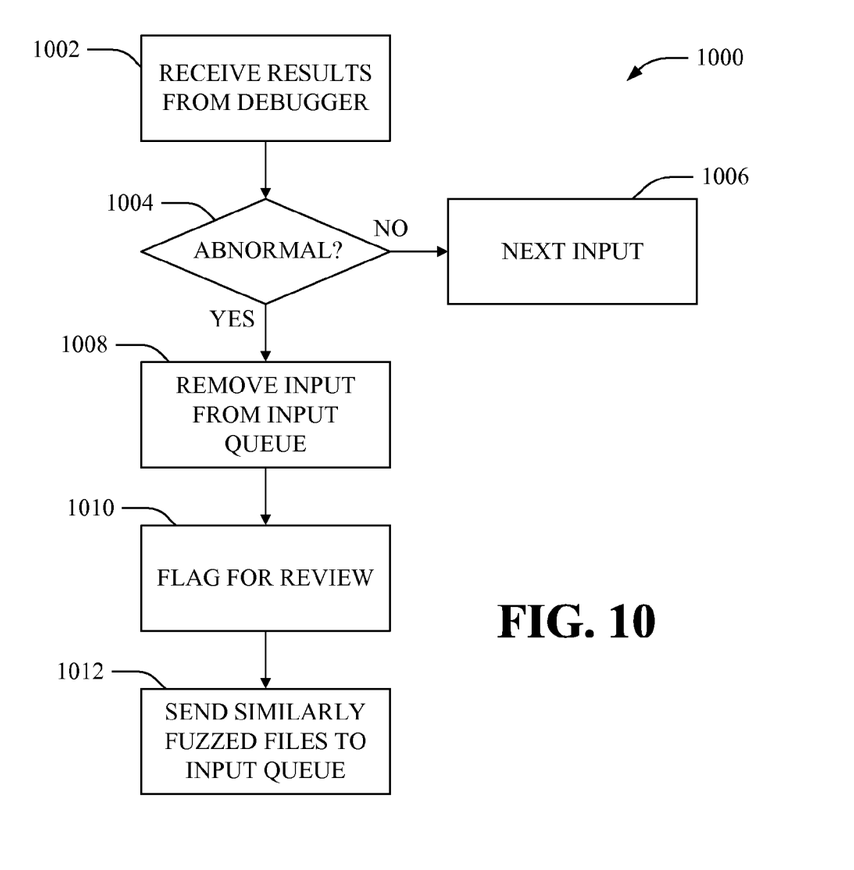
FIG. 10 is a flow chart diagram of an illustrative methodology for analyzing results received in a debugger after a URI fuzz testing routine.

In view of the illustrative systems described supra, methodologies that may be implemented in accordance with the disclosed subject matter will be better appreciated with reference to the flow charts of FIGS. 8, 9, and 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 8 shows a methodology 800 for testing a URI handler. At reference numeral 802, an input is received. The input can be a template file, or a template directory containing several template files. The input can generally comprise a URI header and body, which, when taken together, represent a valid URI. At reference numeral 804, the input can be analyzed to determine whether it contains an input, or is simply and empty directory. If the input is empty, at reference numeral 806, a list of supported URIs can be requested from a registry or other central service. This technique can be employed to test all possible URI protocols supported by a system. Occasionally the tester is not concerned with a particular URI protocol, and desires to test all supported protocols or does not know all supported protocols. In either case, sending an empty input can provide useful results. Once compiled, the list can be sent onward in whole or in part, as shown at reference numeral 808. Once the URIs to be tested are received, either from a registry (from an empty input) or from the input, the URI is fuzzed at reference numeral 810. Here, the URI header and/or body can be fuzzed by corrupting part or all of the data in the URI string. Using the pluggable protocol "http:" a fuzzed URI body can be a set of randomly generated characters, following the header, "http:" To monitor operation of the URI, an instance of a debugger can be initiated at reference numeral 812. Since the fuzzed URI can cause unexpected results once invoked, the debugger can have broad scope, monitoring as much of the system as necessary to detect potential security threats.

At reference numeral 814, the fuzzed URI is invoked by activating the URI as under normal conditions. In the example of a clickable "http:" link, the link is invoked. This can be performed by actually producing the link and instructing the tester to click, or it can be done in an automated manner, without requiring direct user interaction. The debugger monitors the results at reference numeral 816.

Next, FIG. 9 shows an illustrative methodology 900 according to an embodiment of the subject disclosure. At reference numeral 902, an input is received. This input can comprise any template file desired to be used with a file fuzzer for fuzz testing. The input can comprise a directory containing a plurality of template files. At reference numeral 904, the files are fuzzed, as described above. To monitor results, a debugger is launched at reference numeral 906. The debugger can monitor virtually any portion of the system running the test in order to ensure that no unexpected result goes undetected outside the scope of the debugger. The files in the input may or may not be appropriately structured for the URI handler, and at reference numeral 908 this determination is made. If not, a glue application is launched at reference numeral 910. This glue application can contain anything necessary to create appropriately structured fuzzed URIs, including but not limited to appending a header to the fuzzed file, or other formatting required 912. The appropriately structured and formatted URIs are passed to the URI handler at reference numeral 914. The majority of fuzzed URIs will not produce meaningful security bugs, but it is possible for a bug to be located in an unexpected location. For this reason, the results are monitored at reference numeral 916 substantially system-wide. One of the benefits of fuzz testing is that it makes no assumptions about a system, nor about the possible bugs that may be uncovered. As a result, monitoring can be done on a wide variety of areas so as to catch unexpected bugs.

Proceeding to FIG. 10, a methodology 1000 for resolving security bugs is shown and described. At reference numeral 1002, results of a fuzzed URI testing routine are received. At reference numeral 1004, if the URI is handled without any abnormality, the next fuzzed input is analyzed at reference numeral 1006. If there is any detectable abnormality, the fuzzed input, or any derivative thereof, can be removed from the input queue at reference numeral 1008. The fuzzed input that caused the abnormality can be further analyzed before sending a similar input through the testing process. The problem input can be flagged for review at reference numeral 1010. To identify the root of the problem, similarly fuzzed files can be sent to the input queue at reference numeral 1012. The problem input likely contains something that causes the abnormality, and to identify which part of the input that specifically causes the abnormality, the test can be repeated using a fuzzed input including less than the entire fuzzed input from the first case. This process can be repeated until the root cause of the abnormality is identified and isolated.

Figure 11:
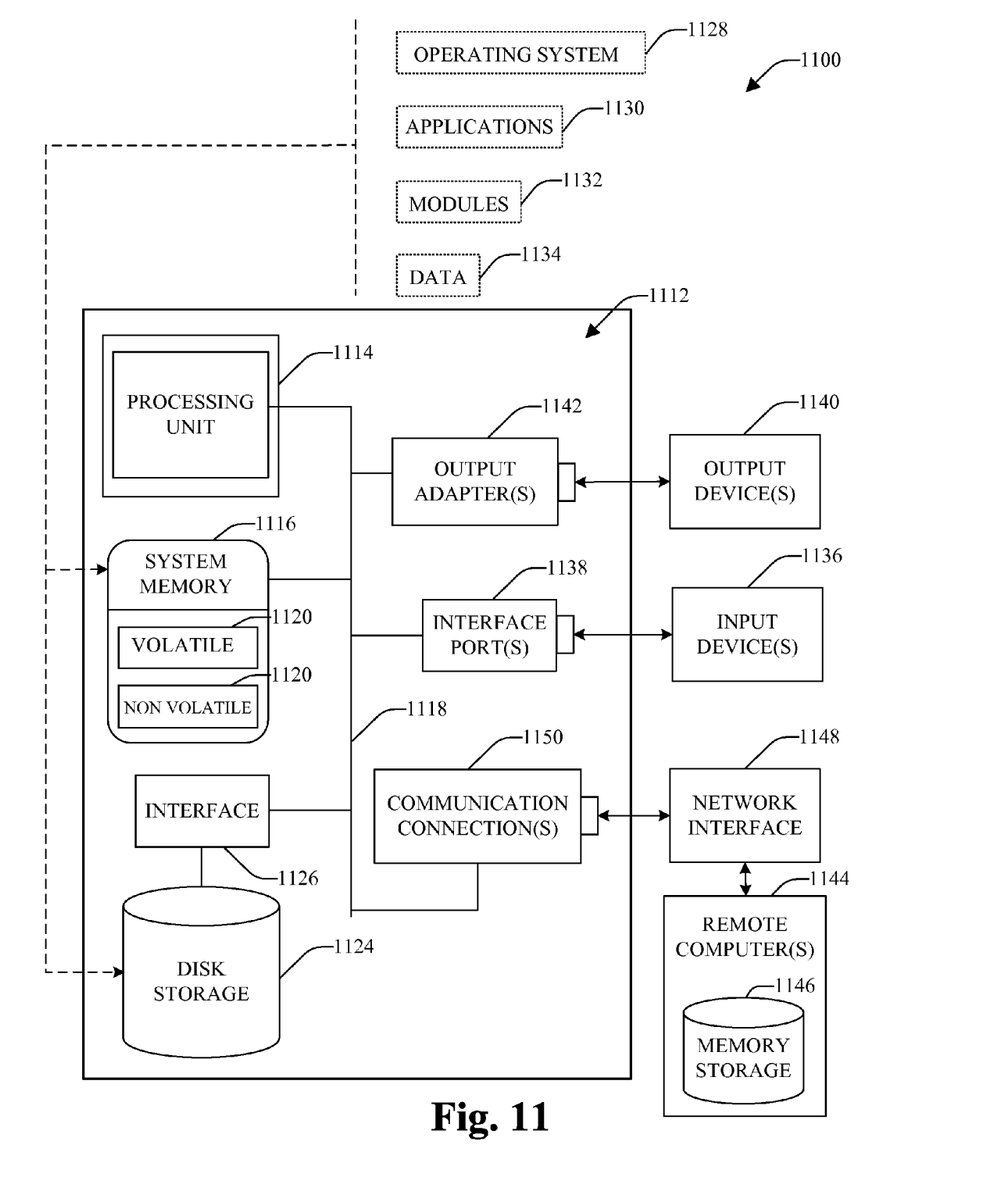
FIG. 11 is a schematic block diagram illustrating a suitable operating environment.
Figure 12:
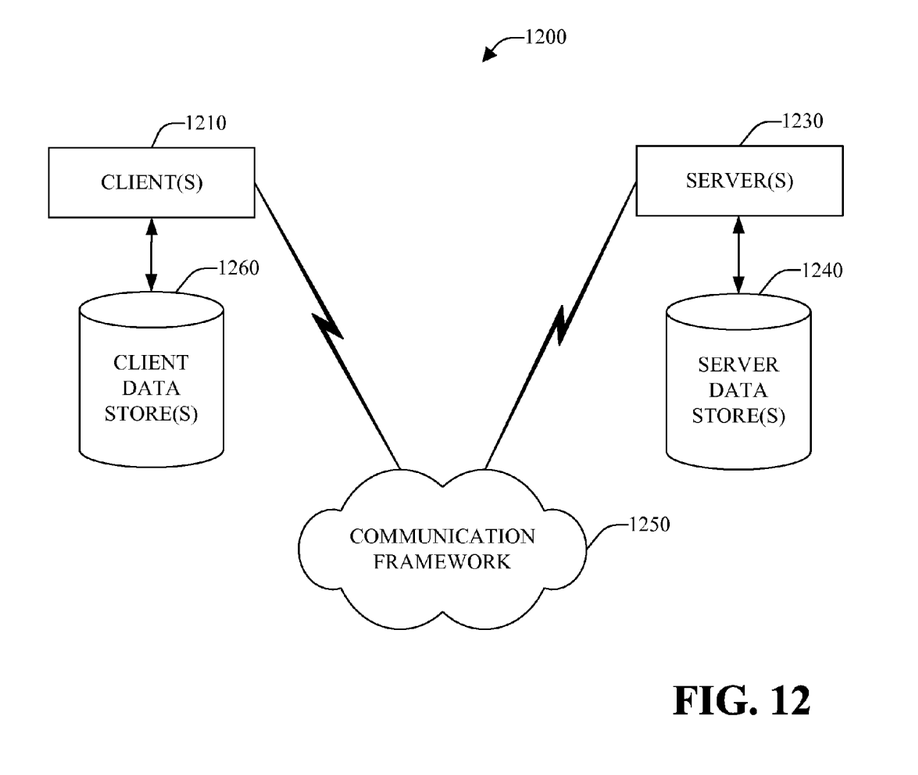
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1100 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 11 18. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A computer-implemented system comprising:
a processor configured to execute computer-executable instructions; and memory storing computer-executable instructions for:
fuzzing, by a fuzzer, at least one valid uniform resource identifier body to generate a fuzzed uniform resource identifier body;
appending a uniform resource identifier header to the fuzzed uniform resource identifier body to create a fuzzed uniform resource identifier;
monitoring, by a debugger, a target application for effects of invocation of the fuzzed uniform resource identifier; and
automatically outputting, by the debugger to the fuzzer, suggested fuzzing for one or more subsequent valid uniform resource identifier bodies based, at least, on monitored effects of the invocation of the fuzzed uniform resource identifier.

2. The computer-implemented system of claim 1, wherein the memory further stores computer-executable instructions for:
receiving, by the fuzzer, a template file including the at least one valid uniform resource identifier.

3. The computer-implemented system of claim 1, wherein the memory further stores computer-executable instructions for:
recording, by the debugger, the effects of the invocation of the fuzzed uniform resource identifier and presenting the effects.

4. The computer-implemented system of claim 1, wherein the suggested fuzzing includes appending a portion of the fuzzed uniform resource body of the fuzzed uniform resource identifier to the one or more subsequent valid uniform resource identifier bodies.

5. The computer-implemented system of claim 1, wherein the memory further stores computer-executable instructions for:
presenting, by the debugger, abnormalities that are above a threshold level of threat.

6. The computer-implemented system of claim 5, wherein the threshold level of threat is set based on user preferences.

7. The computer-implemented system of claim 1, wherein the memory further stores computer-executable instructions for:
obtaining, by the fuzzer, a plurality of uniform resource identifier headers corresponding to a plurality of supported uniform resource identifier protocols.

8. The computer-implemented system of claim 7, wherein the memory further stores computer-executable instructions for:
identifying, by the fuzzer, the plurality of supported uniform resource identifier protocols from the target application.

9. A computer-implemented method comprising:
fuzzing, by a fuzzer on a computing device, at least one valid uniform resource body to generate a fuzzed uniform resource identifier body;
appending a uniform resource identifier header to the fuzzed uniform resource identifier body to create a fuzzed uniform resource identifier;
monitoring, by a debugger on the computing device, a target application for effects of invocation of the fuzzed uniform resource identifier; and
automatically outputting, by the debugger to the fuzzer, suggested fuzzing for one or more subsequent valid uniform resource identifier bodies based, at least, on monitored effects of the invocation of the fuzzed uniform resource identifier.

10. The computer-implemented method of claim 9, further comprising:
flagging, by the debugger, the fuzzed uniform resource identifier based on the monitored effects of the invocation of the fuzzed uniform resource identifier.

11. The computer-implemented method of claim 9, further comprising:
compiling, by the debugger, a report of the effects of the invocation of the fuzzed uniform resource identifier.

12. The computer-implemented method of claim 9, wherein the suggested fuzzing includes appending a portion of the fuzzed uniform resource body of the fuzzed uniform resource identifier to the one or more subsequent valid uniform resource identifier bodies.

13. The computer-implemented method of claim 9, further comprising:
obtaining, by the fuzzer, a plurality of uniform resource identifier headers corresponding to a plurality of supported uniform resource identifier protocols.

14. The computer-implemented method of claim 13, further comprising:
identifying, by the fizzer, the plurality of supported uniform resource identifier protocols from the target application.

15. The computer-implemented method of claim 9, further comprising:
presenting, by the debugger, abnormalities that are above a threshold level of threat.

16. The computer-implemented method of claim 15, wherein the threshold level of threat is set based on user preferences.

17. A computer-readable memory storing computer-executable instructions that, when executed by a computing device, cause the computing device to perform operations comprising:
fuzzing, by a fuzzer on the computing device, at least one valid uniform resource identifier body to generate a fuzzed uniform resource identifier body;
appending a uniform resource identifier header to the fuzzed uniform resource identifier body to create a fuzzed uniform resource identifier;
monitoring, by a debugger on the computing device, a target application for effects of invocation of the fuzzed uniform resource identifier; and
automatically outputting, by the debugger to the fuzzer, suggested fuzzing for one or more subsequent valid uniform resource identifier bodies based, at least, on monitored effects of the invocation of the fuzzed uniform resource identifier.

18. The computer-readable memory of claim 17, further storing computer-executable instructions for:
obtaining, by the fuzzer, a plurality of uniform resource identifier headers corresponding to a plurality of supported uniform resource identifier protocols.

19. The computer-readable memory of claim 18, further storing computer-executable instructions for:
identifying, by the fuzzer, the plurality of supported uniform resource identifier protocols from the target application.

20. The computer-readable memory of claim 17, wherein the suggested fuzzing includes appending a portion of the fuzzed uniform resource body of the fuzzed uniform resource identifier to the one or more subsequent valid uniform resource identifier bodies.

* * * * *